United States Patent Office 2,744,892
Patented May 8, 1956

2,744,892

CRYSTALLIZATION OF DIHYDROSTREPTOMYCIN SULPHATE

Leon Katz, Springfield, N. J., assignor to Schenley Industries, Inc., New York, N. Y., a corporation of Delaware No Drawing. Application June 2, 1952, Serial No. 291,290

6 Claims. (Cl. 260—210)

This invention relates to the recovery and purification of dihydrostreptomycin and has for its principal object the provision of an improved process for crystallization of dihydrostreptomycin sulphate.

It has been proposed heretofore to produce dihydrostreptomycin sulphate in crystalline form in order to provide the salt in high purity suitable for therapeutic use. Crystallization is employed to insure the production of products having this high purity and to provide standardization in distribution and use. The salt, however, is not readily crystallizable. When precipitated from aqueous solutions by addition of certain water-miscible solvents, it separates as amorphous solid particles which may lack the desired purity and which are more hygroscopic than crystalline products.

Crystalline dihydrostreptomycin sulphate has been obtained heretofore by crystallization from aqueous methanol solutions. In accordance with one such typical procedure, methanol is added to the aqueous solution of dihydrostreptomycin sulphate, at room temperature, and in an amount not greater than that required to produce a faint turbidity, indicating super-saturation. When sufficient methanol has been added to produce turbidity, a small quantity of seed crystals from a prior batch is added, and the mixture is stirred at prevailing room temperature for periods of 16 hours or longer.

Such crystallizing processes as have been employed heretofore may be defined as involving the use of two-solvent systems in which water is one component and the other component is a water-miscible alcohol such as methanol, ethanol, isopropanol or ethylene glycol, in which dihydrostreptomycin sulphate is substantially insoluble.

I have found that the time required to effect the crystallization of dihydrostreptomycin sulphate from aqueous solutions can be reduced to two hours or less in accordance with the process of my invention by using multiple-solvent systems containing at least three solvents. The multiple-solvent systems which I use comprise water, a water-soluble monohydric alcohol, in which dihydrostreptomycin sulphate is substantially insoluble, and at least one other organic solvent which is soluble in the aqueous solution of the monohydric alcohol, whose exact function is not clearly understood, as more specifically pointed out hereinafter.

A multiple-solvent system suitable for use in carrying out the process of my invention consists of at least one or more solvents of each of the three following classes: (1) water, (2) a lower alkyl (water-miscible, monohydric) alcohol, such as methanol, ethanol, n-propanol and isopropanol, in which dihydrostreptomycin sulphate is substantially insoluble, and (3) a solvent of the group consisting of formamide, dimethyl formamide and polyhydric alcohols, including ethylene glycol, glycerol, propylene glycol and diethylene glycol.

Dihydrostreptomycin sulphate from any source may be recovered and crystallized in accordance with the process of my invention. Thus, for example, the aqueous solution which is treated may be produced (1) by dissolving in water amorphous dihydrostreptomycin sulphate from any source, (2) by concentrating to the desired extent an aqueous solution of the salt produced by reduction of streptomycin or a streptomycin salt, and (3) by effecting a metathetical reaction in aqueous solution between another dihydrostreptomycin salt and a salt of sulphuric acid. The aqueous solution employed preferably is highly concentrated or even substantially completely saturated with respect to dihydrostreptomycin sulphate. Its hydrogen-ion concentration is preferably equivalent to a pH in the range of 5.5 to 7.5.

Crystallization of the dihydrostreptomycin sulphate preferably is carried out with stirring at a temperature in the range, 45° C. to 65° C. When precipitation is carried out at room temperature, the precipitate formed may be gummy, rather than crystalline, initially. The use of temperatures in the range, 45° C. to 65° C., as compared with room temperature, accelerates crystallization, and the increased rate of crystallization, coupled with the effects of stirring, promotes the formation of crystals having desirably small sizes and hard, compact structures which insure high purity. Precipitation may be carried out advantageously in the presence of previously formed crystals of dihydrostreptomycin sulphate employed for seeding purposes.

In a process comprising a preferred embodiment of my invention, glycerol or an equivalent solvent as specified above is added first to the aqueous solution in an amount equal to between approximately 20% and approximately 100% of the volume of the aqueous solution to form a solution comprising the two solvents, and, thereafter, the monohydric alcohol is added in an amount sufficient to produce a persistent turbidity in the solution. The turbid three-solvent system, which is maintained at the specified temperature between 45° and 65° C., clears as crystallization commences and progresses. One or more increments of monohydric alcohol are then added from time to time to reestablish turbidity and promote the separation of additional quantities of crystals until the desired yield of crystalline dihydrostreptomycin sulphate has been obtained or until the subsequent crops of crystals no longer have the desired purity.

After crystallization has been completed in the foregoing manner, the crystals can be separated from the mother liquor by filtration, centrifugation, or other conventional means, washed with a monohydric alcohol and dried.

In order to prepare crystals of dihydrostreptomycin sulphate which are sterile and free from pyrogenic impurities, distilled, pyrogen-free water is preferably used in preparing the original aqueous solution, and the aqueous solution and the other liquids which are used in the process are sterilized by being passed through sterilizing filters such as fine fritted-glass or Seitz filter discs.

Instead of adding the methanol or other water-miscible monohydric alcohol to the aqueous solution containing all the glycerol or equivalent solvent, as described hereinbefore, all or a portion of the monohydric alcohol can be added together with all or a portion of the glycerol or equivalent solvent. Such a process is illustrated in Examples 3 and 4 hereinafter.

Although it is desirable to recover all or as much as possible of the dihydrostreptomycin sulphate in the original aqueous solution, the purity of the first crop of crystals will be greater than that of subsequent crops. Accordingly, the crystallization need not be carried to a point at which substantially none of the dihydrostreptomycin sulphate remains in the mother liquor. The process of this invention, as is evident, can be adapted to use for fractional crystallization.

The following examples illustrate processes which may be carried out in accordance with the invention:

Example 1

Two hundred twenty-five (225) grams of crude amorphous dihydrostreptomycin sulphate, obtained by precipitation from an aqueous solution by methanol, was dissolved in 568 grams of water and the resulting solution was filtered through a glass funnel fitted with a fine sintered-glass disc to yield a clear amber-colored filtrate. The amber-colored filtrate was diluted with 630 grams (500 milliliters) of glycerol and placed in a constant-temperature bath maintained at a temperature in the range, 52° C. to 54° C. After the temperature of the water-glycerol solution had reached 50° C., methanol was added until the solution became turbid. Approximately 700 to 800 milliliters of methanol were added. A small amount of crystals of dihydrostreptomycin sulphate obtained from a preceding batch was then added to seed the turbid solution, and the resulting liquid product was stirred gently, while maintaining the bath between 52° C. and 54° C., until crystallization was induced. When the turbidity disappeared, methanol was added slowly in small increments, with the production alternately of turbid and clear solutions, until precipitation of available dihydrostreptomycin sulphate appeared to be suitably complete and a suspension of crystals in mother liquor was formed. The total quantity of methanol added was 1580 grams (2000 milliliters), and the total period of time required for crystallization was one and three-quarters (1¾) hours. The crystals were separated from the mother liquor by suction filtration, washed with 1750 grams (2200 milliliters) of methanol and dried in a vacuum oven at 38° C. for 18 hours.

From the mother liquor (4200 milliliters), 5.0 grams of amorphous material was subsequently recovered. The yield of crystalline dihydrostreptomycin sulphate was 215 grams or 95.5% of the original and the overall recovery (determined by bioassay) was 97.5% of the original. When re-dissolved in water at a concentration of 200,000 units per milliliter, the solution prepared from the crystalline dihydrostreptomycin sulphate was clear and colorless and had a nephelometer reading of 40.

Example 2

Ten (10) grams of a crude amorphous dihydrostreptomycin sulphate similar to that used in Example 1, was dissolved in 25 grams of water and filtered as described in Example 1. The filtrate was diluted with 25 milliliters of ethylene glycol, and the resulting solution was heated to 60° C. Methanol was added to the heated solution until turbidity developed and persisted, and the turbid solution was allowed to stand to permit initial crystallization while being maintained at approximately 60° C. Additional methanol was added as in Example 1 to complete the crystallization. The crystals were separated and dried in accordance with the procedure outlined in Example 1.

Example 3

A crude methanol-precipitated dihydrostreptomycin sulphate product having a biological assay of 592 micrograms of dihydrostreptomycin base per milligram was purified and crystallized as follows:

Approximately 41.5 kilograms of the crude dihydrostreptomycin sulphate (equivalent to a total of 24.568 kilograms of base) were dissolved in 55 liters of sterile pyrogen-free water that had been heated to a temperature of 55° C., and the resulting solution was filtered through a sterilizing filter disc. The resulting solution assayed 325,000 micrograms of dihydrostreptomycin base per liter. To this solution was added 110 liters of a mixture of glycerol and methanol (1:2 by volume), having a temperature of approximately 55° C., that had been sterilized by filtration through a Seitz filter. The solutions were stirred continuously during the addition of the glycerol-methanol mixture and for approximately one-half (½) hour thereafter, the temperature of the mixture being maintained at approximately 55° C. Thereafter, an additional 45 liters of the glycerol-methanol mixture was added at the rate of approximately 1 liter per minute, and the stirring was continued for 10 to 15 minutes thereafter. Crystals of dihydrostreptomycin sulphate were separated from the mother liquor by centrifugation, washed with approximately 160 liters of methanol, and dried in a vacuum oven at a temperature of approximately 115° F. (46° C.). The yield of product was 31.7 kilograms of crystals which assayed 702 micrograms of dihydrostreptomycin base per milligram, or a total of 22.25 kilograms of base, which corresponded to a recovery of 90.5% of the dihydrostreptomycin. It conformed to commercial standards for this product.

Example 4

A volume of 160 liters of an aqueous solution of crude dihydrostreptomycin sulphate which assayed 350,000 micrograms of dihydrostreptomycin base per milliliter (total of 56.6 kilograms of base) was adjusted to a pH of approximately 5.5 by addition of sulphuric acid, sterilized by filtration through a sterilizing filter and heated to a temperature of approximately 55° C. An equal volume (160 liters) of a mixture of 1 volume of glycerol and 4 volumes of methanol, which previously had been sterilized by filtration and heated to 55° C., was added to the dihydrostreptomycin sulphate solution in an initial amount of 130 liters and in a second amount of 30 liters that was added within approximately 1 hour after dihydrostreptomycin sulphate had begun to crystallize, with continuous stirring or agitation. The second amount was also added slowly at the rate of about 1 liter per minute. Crystallization was allowed to proceed with stirring or agitation for about 30 minutes after the addition of the final portion of the glycerol-methanol mixture. Thereafter, 160 liters of filtered methanol (at prevailing room temperature) was added, with stirring, at a rate of approximately 4 liters per minute and, finally, approximately 320 liters of filtered methanol were incorporated in the mixture at a rate of approximately 10 liters per minute.

The resulting mixture, thereafter, was centrifuged to recover the crystalline dihydrostreptomycin sulphate, and the crystals were washed with approximately 200 liters of cold filtered methanol, and dried in a vacuum dryer at a temperature of approximately 115° F. (46° C.) and a pressure of approximately 1 to 3 millimeters.

The quantity of crystalline dihydrostreptomycin sulphate thus obtained, based upon the biological assay, corresponded to 52.3 kilograms of dihydrostreptomycin base. The rejected mother liquor assayed a total of 0.32 kilogram of dihydrostreptomycin base. The total recovery was 92.4% of the original assay.

The crystalline dihydrostreptomycin sulphate produced had a purity of 713 micrograms of dihydrostreptomycin base per milligram. Its moisture content was 1.42% and it contained 2.87% volatile matter, 0.98% unconverted streptomycin, and dissolved in water to a solution having a pH of 5.5 and satisfactory clarity. The product passed accepted standards as to sterility and freedom from histamine and pyrogens.

Example 5

Thirty (30) milliliters of an aqueous solution of dihydrostreptomycin sulphate assaying 300,000 micrograms of dihydrostreptomycin base per milliliter was heated to a temperature of 50° C., and 15 milliliters of formamide was added thereto. Methanol was added in increments while the mixture was maintained at a temperature of about 50° C. until no further turbidity developed. The mixture was chilled, the crystals were separated from the mother liquor by filtration, washed with methanol and dried in a vacuum oven. A yield of 9.3 grams of dihydrostreptomycin sulphate crystals was obtained, which corresponds to a recovery of 92% of the biological assay of the original. The total crystallization period was 0.85 hour.

*Example 6*

In another crystallization procedure similar to that described in Example 5, dimethyl formamide was employed in place of formamide. Thirty (30) milliliters of dimethyl formamide was added to 30 milliliters of the dihydrostreptomycin sulphate solution, and the temperature was maintained at 60° C. An oil separated after the addition of the dimethyl formamide, but the oil was converted to crystalline form upon stirring. Methanol was then added to complete the crystallization. The yield of crystalline dihydrostreptomycin sulphate was 10.0 grams and its purity was 727 micrograms of base per milligram.

Inasmuch as the foregoing specification comprises preferred embodiments of the invention, it is to be understood that these are merely exemplary and have been selected for purposes of illustration, and that obvious alterations and modifications in conventional manner will suggest themselves to those skilled in the art; accordingly the invention is not limited in scope except as circumscribed by the claims appended hereto.

I claim:

1. A process for the recovery and purification of dihydrostreptomycin sulphate from an aqueous solution of crude dihydrostreptomycin sulphate which comprises adding to the aqueous solution a substantial proportion of a solvent of the group consisting of ethylene glycol, glycerol, propylene glycol, diethylene glycol, formamide and dimethyl formamide, adding to the resulting solution such an amount of methanol that turbidity is developed, thereafter maintaining the solution at a temperature between approximately 45° C. and approximately 65° C. while crystallization of the salt proceeds, and subsequently recovering the crystalline salt.

2. A process as defined in claim 1 in which the methanol is added to the aqueous solution of the crude dihydrostreptomycin sulphate in admixture with the solvent of the group consisting of ethylene glycol, glycerol, propylene glycol, diethylene glycol, formamide and dimethyl formamide.

3. A process for the recovery and purification of dihydrostreptomycin sulphate which comprises dissolving crude dihydrostreptomycin sulphate in water and adding to the solution a substantial proportion of ethylene glycol, thereafter adding to the resulting solution such an amount of methanol that turbidity is developed, thereafter maintaining the solution at a temperature between approximately 45° C. and approximately 65° C. while crystallization of the salt proceeds, and, after disappearance of the initial turbidity, successively adding small increments of methanol to the solution while maintained at the preselected crystallizing temperature, and, subsequently, recovering the crystalline dihydrostreptomycin sulphate.

4. A process for the recovery and purification of dihydrostreptomycin sulphate which comprises dissolving crude dihydrostreptomycin sulphate in water and adding to the solution a substantial proportion of glycerol, adding to the resulting solution such an amount of methanol that turbidity is developed, thereafter maintaining the solution at a temperature between approximately 45° C. and approximately 65° C. while crystallization of the salt proceeds, and, after disappearance of the initial turbidity, successively adding small increments of methanol to the solution maintained at the preselected crystallizing temperature, and subsequently recovering the crystalline dihydrostreptomycin sulphate.

5. A process for the recovery and purification of dihydrostreptomycin sulphate which comprises dissolving the crude salt in water and thereafter adding to the solution, while it is maintained at a temperature between approximately 45° C. and approximately 65° C., a substantial proportion of a mixture of 2 volumes of methanol and 1 volume of glycerol, and subsequently recovering the resulting crystals of dihydrostreptomycin sulphate.

6. A process for the recovery and purification of dihydrostreptomycin sulphate which comprises dissolving the crude salt in water and thereafter adding to the solution while it is maintained at a temperature between 45° C. and 65° C., a substantial proportion of a mixture of 4 volumes of methanol and 1 volume of glycerol, and subsequently recovering the resulting crystals of dihydrostreptomycin sulphate.

References Cited in the file of this patent

UNITED STATES PATENTS

| | | |
|---|---|---|
| 2,538,099 | Hoffman et al. | Jan. 16, 1951 |
| 2,552,547 | Fried et al. | May 15, 1951 |
| 2,590,140 | Wolf | Mar. 25, 1952 |
| 2,594,245 | Wolf | Apr. 22, 1952 |
| 2,640,054 | Peet | May 26, 1953 |